United States Patent [19]

Kettelson et al.

[11] Patent Number: 5,485,911
[45] Date of Patent: Jan. 23, 1996

[54] INTERIOR LINE-SHAFT DRIVEN POWERED ROLLER CONVEYOR

[75] Inventors: Russell W. Kettelson, Drayton Plains; Dion Spurr, Sterling Heights, both of Mich.

[73] Assignee: Newcor, Inc., Bloomfield Hills, Mich.

[21] Appl. No.: 208,606

[22] Filed: Mar. 9, 1994

[51] Int. Cl.⁶ .................................................. B65G 13/06
[52] U.S. Cl. ..................................... 198/791; 198/781.02
[58] Field of Search .......................... 198/781.02, 781.04, 198/781.07, 791, 789

[56] References Cited

U.S. PATENT DOCUMENTS

| | | | |
|---|---|---|---|
| 4,015,706 | 4/1977 | Goffredo et al. | 198/791 X |
| 4,185,735 | 1/1980 | Hammond. | |
| 4,416,650 | 11/1983 | Wilkins | 198/789 X |
| 4,844,231 | 7/1989 | Usui. | |
| 4,884,676 | 12/1989 | Suizu. | |
| 4,930,613 | 6/1990 | Okura et al.. | |
| 5,188,215 | 2/1993 | Riezler | 198/791 X |

FOREIGN PATENT DOCUMENTS

| | | | |
|---|---|---|---|
| 0129911 | 1/1985 | European Pat. Off. | 198/791 |
| 81-012796 | 6/1981 | France. | |
| 3629620 | 3/1988 | Germany | 198/791 |
| 61-7111 | 1/1986 | Japan. | |
| 1-285515 | 11/1989 | Japan. | |
| 1270064 | 11/1986 | U.S.S.R. | 198/791 |
| WO91/09793 | 7/1991 | WIPO. | |

*Primary Examiner*—D. Glenn Dayoan
*Attorney, Agent, or Firm*—Flynn, Thiel, Boutell & Tanis

[57] ABSTRACT

A cantilevered-shaft type roller conveyor in which roller units are cantilevered inwardly from side frames. Each roller unit includes a sleevelike roller member supported directly on and surrounding a drive member, the latter being rotatably supported on a cantilevered shaft which is secured to and projects inwardly from the side frame. The drive member has a bevel drive gear which is fixedly and integrally formed on an inner free end thereof, which drive gear is driven from a mating bevel gear secured to a rotatable line shaft which is positioned inside the respective side frame and extends longitudinally of the conveyor. The drive member is preferably constructed of a suitable bearing material, such as sintered metal, to function both as a driving member and as a bearing to permit direct rotatable support of the sleeve roller member.

17 Claims, 6 Drawing Sheets

INTERIOR LINE-SHAFT DRIVEN POWERED ROLLER CONVEYOR

FIELD OF THE INVENTION

This invention relates to a powered roller conveyor employing cantilevered roller units mounted on spaced side frames to permit transporting of loads, including loads which project into the space between the sidewardly-spaced roller units, and particularly to an improved roller unit and rotatable drive arrangement therefor.

BACKGROUND OF THE INVENTION

Conventional powered roller conveyors employ support shafts which extend across the width of the conveyor and support coaxially aligned rollers adjacent the opposite side frames. Such conveyors simplify the driving of the coaxially aligned pairs of rollers since a single shaft can drive both rollers of the pair. However, such conveyors can be used only on selected types of loads since the entirety of the load must be positioned above the shaft.

The use of through shafts also imposes greater restraints on the use and particularly the adaptability of the conveyor in terms of its width so as to permit the conveyor to accommodate different types of loads.

To overcome the disadvantages associated with through-shaft type roller conveyors, cantilevered-shaft roller conveyors are also known. In conveyors of this latter type, the rollers are supported on cantilevered shafts which project inwardly from the side frames, whereby the coaxially aligned pairs of rollers define an open region therebetween.

While known cantilevered-shaft roller conveyors do overcome some of the disadvantages associated with through-shaft roller conveyors, nevertheless known cantilevered-shaft roller conveyors have themselves possessed features which have been less than desirable. For example, such conveyors typically employ drive shafts (commonly referred to as "line shafts") which extend longitudinally of the conveyor and are typically drivingly connected to the roller units through gears, chains and the like. These line shafts are typically disposed exteriorly of the side frames, whereby the roller units are supported on shafts which project through the side frame and have a drive member such as a gear on the outer end, and the drive roller on the inner end. Such arrangements typically result in rather complex driving connections and roller units, and in addition position rotatable driving members exteriorly of the frame whereby they obstruct access to the sides of the conveyor and are undesirably positioned relative to operating personnel.

Many of the known conveyors have also employed roller units which are of substantial structural complexity in view of the number of parts and bearings required, and which have resulted in significantly complex drive arrangements and connections. Such units also have typically permitted solely positive driving of the rollers, or frictional driving of the rollers, but have not readily permitted the user to select one or the other without requiring some significant and complex structural rearrangement.

Examples of prior art conveyors are illustrated by the following: U.S. Pat. Nos. 4,185,735, 4,844,231, 4,884,676, 4,930,613; French Patent No. 81 12796; Japanese Patent Publications 1-285515 and 61-7111; and Publication WO 91/09793. These publications illustrate both cantilevered-type and through-shaft roller conveyors which possess disadvantages of the type discussed above.

Accordingly, it is an object of this invention to provide an improved cantilevered-type roller conveyor which overcomes many of the disadvantages associated with known conveyors of this general type.

More specifically, in the improved cantilevered-shaft type roller conveyor of this invention, the roller units as cantilevered inwardly from the side frames of the conveyor are of an improved and simplified construction in that a sleevelike roller member is supported directly on and surrounds a drive member, the latter being rotatably supported on a cantilevered shaft which is secured to and projects inwardly from the side frame. The drive member, in a preferred embodiment of the conveyor, has a bevel drive gear which is fixedly and preferably integrally formed on an inner free end thereof, which drive gear is driven from a mating bevel gear secured to a rotatable line shaft which is positioned inside the respective side frame and extends longitudinally of the conveyor. The drive member is preferably constructed of a suitable bearing material, such as sintered metal, to permit it to function both as a driving gear member and as a bearing to permit direct rotatable support of the sleeve roller member.

In the improved conveyor of this invention, as aforesaid, the drive member and sleeve roller member also preferably have a selectable coupling arrangement therebetween which, depending upon the axial orientation of the sleeve roller member relative to the drive member, permits either direct and positive driving of the sleeve roller member or frictional driving thereof so as to permit either positive stopping of the roller member or overrunning thereof, depending upon the selected mounting orientation of the roller member.

With the preferred cantilevered-type roller conveyor of this invention, as aforesaid, loads can be conveyed along the conveyor which have a size or geometry such as to protrude into an open region defined between the sidewardly-spaced roller units, and the loads can be positively stopped at a precise location when the sleeve roller members are positively driven from the drive members, or alternatively the sleeve roller members can be permitted to rotate relative to the drive members, such as to permit overrunning. In addition, the line shafts for driving the rollers are positioned interiorly of the side frames so as to maximize accessibility and clearance exteriorly of the side frames. The roller units also minimize the number of parts, including bearings, to simplify the overall construction, assembly and repair if necessary.

Other objects and purposes of the invention will be apparent to persons familiar with structures of this general type upon reading the following specification and inspecting the accompanying drawings.

Figure 1:
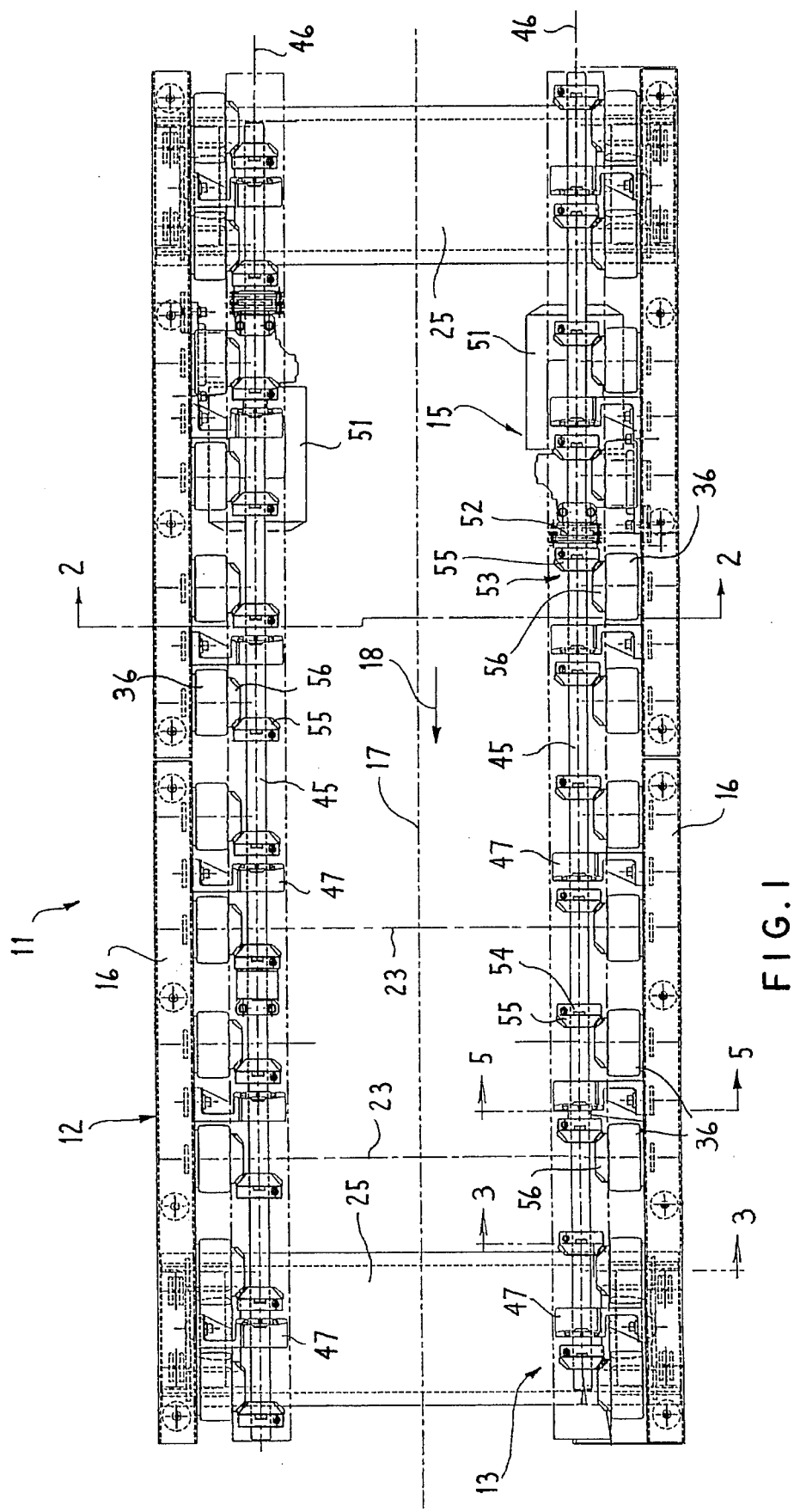
FIG. 1 is a top plan view of a cantilevered-type roller conveyor according to the present invention.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will refer to the normal direction of load movement along the conveyor, which direction is leftwardly in FIG. 1. The words "inwardly" and "outwardly" will refer to directions toward and away from, respectively, the geometric center of the conveyor and designated parts thereof. Said terminology will include the words specifically mentioned, derivatives thereof, and words of similar import.

DETAILED DESCRIPTION

Figure 2:
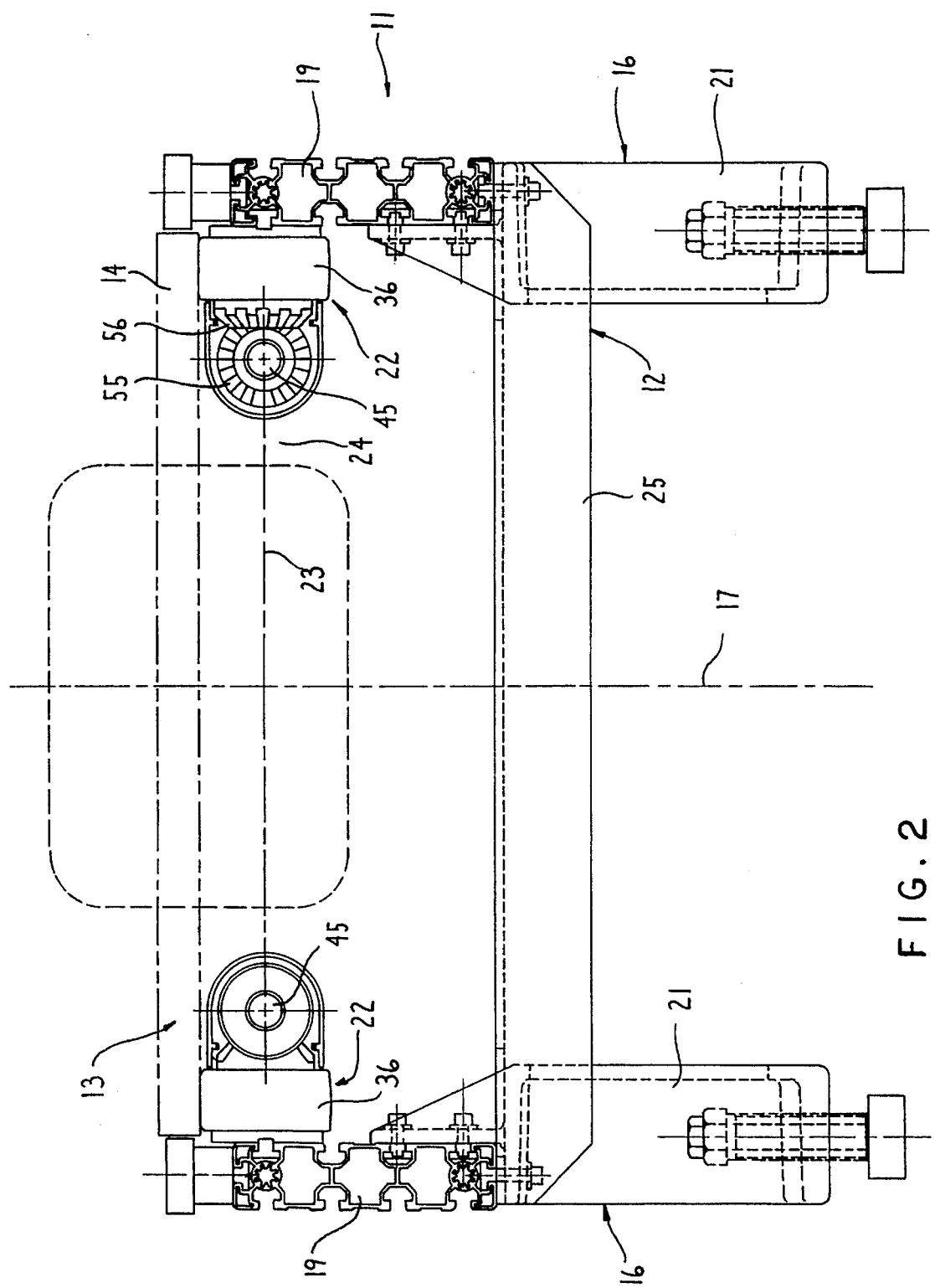
FIG. 2 is an enlarged sectional view taken generally along line 2—2 in FIG. 1.

FIGS. 1 and 2 illustrate a cantilevered-type roller conveyor 11 according to the present invention. This conveyor includes a generally horizontally elongated frame 12 on which a plurality of roller assemblies 13 are supported in longitudinally-spaced relationship along the frame. The roller assemblies provide support for loads 14, such as pallets.

The frame 12 includes a pair of generally parallel and horizontally elongated side frame assemblies 16 which are disposed uniformly on opposite sides of a longitudinally extending central vertical plane 17. The loads are moved longitudinally of the conveyor substantially as indicated by the arrow 18 in FIG. 1.

Each side frame assembly 16 includes a horizontally elongate side frame rail 19 which is supported in upwardly-spaced relationship from a suitable floor by a plurality of upright legs 21.

Each roller assembly 13 includes a pair of roller units 22 which are mounted on the opposite side frame rails 19 and which project inwardly in coaxially aligned relationship with one another and define a generally horizontal rotational axis 23 which extends transversely of the conveyor in substantially perpendicular relationship to the longitudinal central plane 17. The coaxially aligned and opposed pair of roller units 22 are spaced a significant distance apart so as to define an open space or region 24 therebetween of significant magnitude. These roller units are driven by a drive arrangement 15.

The side frame assemblies 16 are rigidly joined together at selected longitudinally-spaced intervals by cross ties 25 which are spaced downwardly a substantial distance below the roller assemblies 13.

Figure 3:
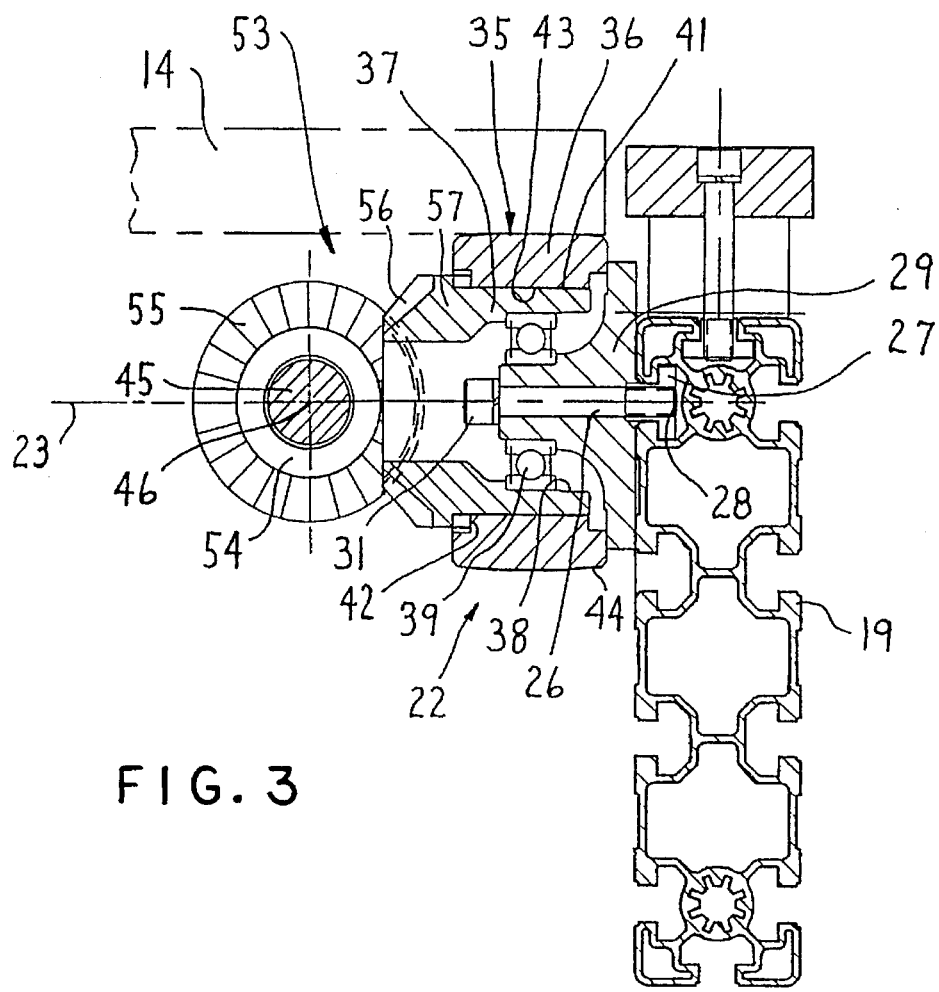
FIG. 3 is a fragmentary, enlarged sectional view taken substantially along line 3—3 in FIG. 1.
Figure 4:
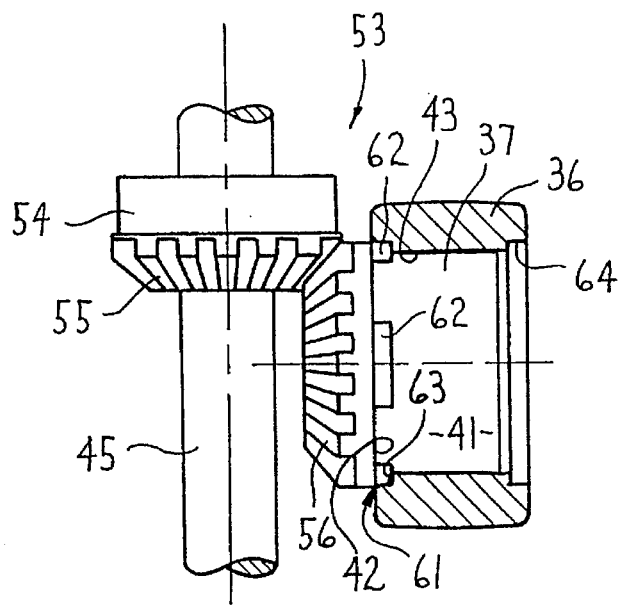
FIG. 4 is a top view of the drive gear arrangement illustrated in FIG. 3.
Figure 5:
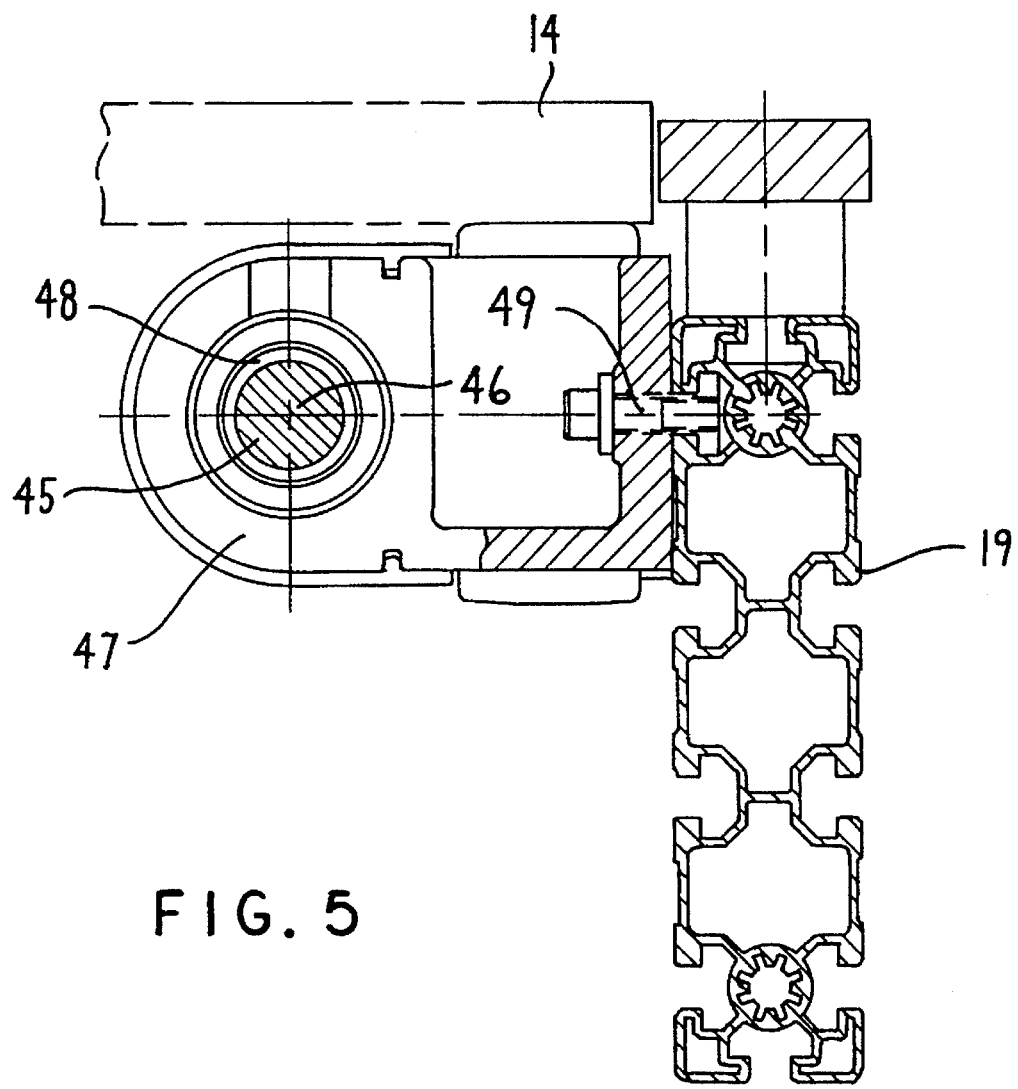
FIG. 5 is an enlarged, fragmentary sectional view taken along line 5—5 in FIG. 1.
Figure 8:
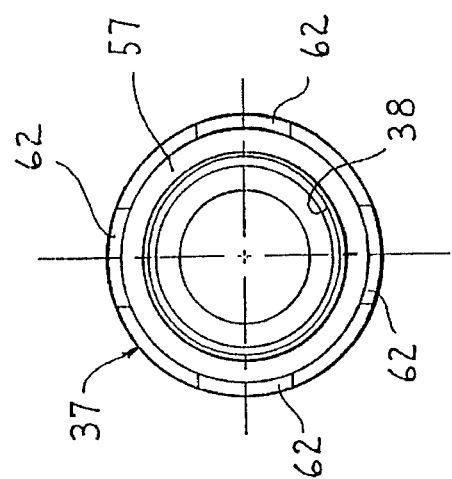
FIGS. 7 and 8 are respectively central sectional and end views of the roller unit of FIG. 6.
Figure 7:
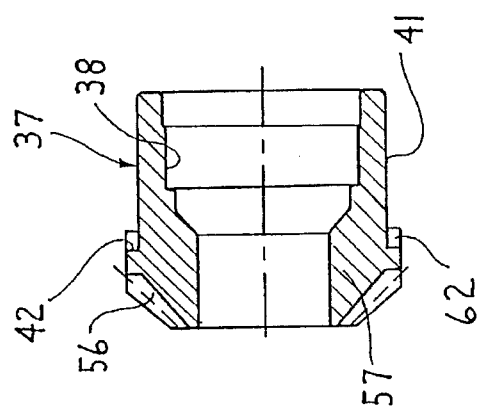
Figure 6:
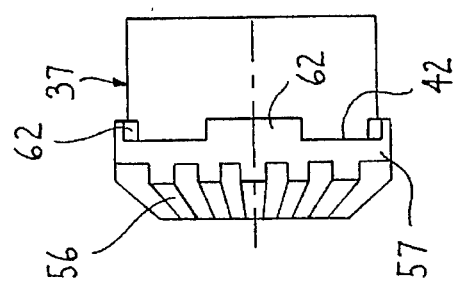
FIG. 6 is a side view of the driving member for the roller unit.
Figure 11:
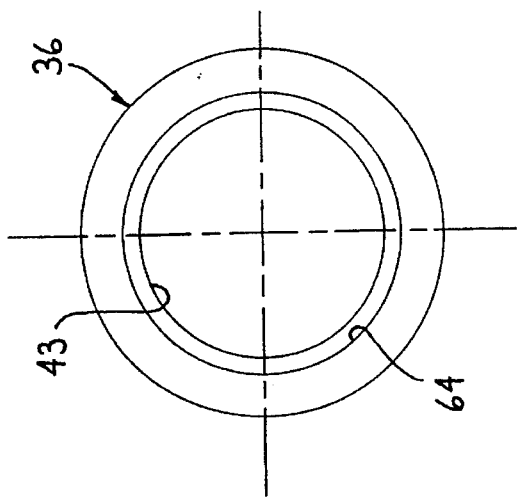
FIGS. 10 and 11 are respectively the left and right sides of the sleeve roller illustrated in FIG. 9.
Figure 9:
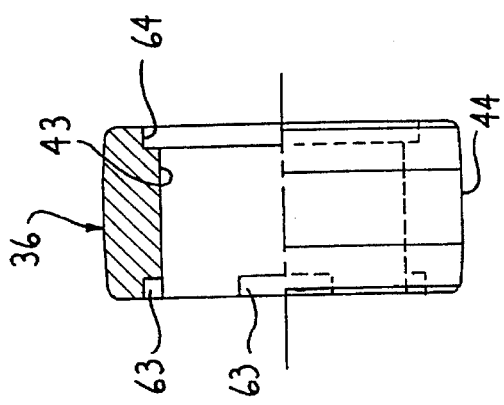
FIG. 9 is a side view, partially in cross section, of the sleeve roller associated with the roller unit.
Figure 10:
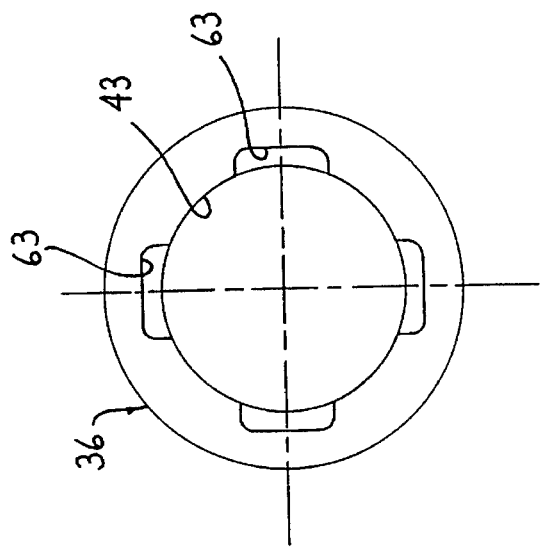

Considering now the cantilevered roller unit 22 and referring specifically to FIGS. 3 and 4, this roller unit includes a cantilevered support shaft (i.e. a threaded screw) 26 which is threadably engaged with a T-nut 27 positioned within a T-shaped slot or channel 28 formed in and extending longitudinally of the side frame rail 19. The support shaft 26 projects horizontally in cantilevered relationship from the side frame rail generally along the rotational axis 23 and projects coaxially through a surrounding annular support member 29, whereby member 29 is stationarily held against the side rail 19 by the enlarged head 31 as defined at the free end of the shaft or screw 26.

Each roller unit 22 includes a two-piece roller 35 which is rotatably supported on the annular support member 29. This two-piece roller 35 includes an outer member 36 and an inner member 37, both of which are annular in the illustrated embodiment, and concentrically surround the axis 23. The inner member 37, which functions as the drive member, has a stepped cylindrical bore 38 extending coaxially therethrough whereby the inner member 37 projects axially over and concentrically surrounds a part of the support member 29. One or more suitable bearings 39, such as antifriction bearings, are preferably engaged between the annular support 29 and the axially outer portion of the drive member 37 to provide rotatable and load-bearing support therebetween. Alternately, the inner member 37 can be directly rotatably supported on the support 29, the latter being formed with a suitable cylindrical bearing journal portion (not shown) to rotatably support the member 37. The drive member 37 also defines a cylindrical outer surface 41 which projects axially from the outer end of the member and terminates in a radially outwardly projecting annular shoulder 42.

The outer member 36 constitutes a sleeve roll and has a bore of uniform diameter extending coaxially therethrough as defined by an inner cylindrical surface 43. The sleeve roll 36 defines thereon an exterior cylindrical surface 44 of significant axial extent, which exterior surface 44 functions as the contacting surface for engagement with the loads 14.

The inner cylindrical surface 43 of the sleeve roll 36 has a diameter which substantially equals but is only slightly larger than the diameter of the exterior cylindrical surface 41 of the drive member 37 to permit the sleeve roll 36 to be frictionally driven from the drive member 37 while at the same time permit limited relative rotation therebetween, such as overrunning of the roll 36.

The drive arrangement 15 (FIG. 1) for driving the roller units 22 includes a pair of horizontally elongate drive or line shafts 45 which extend in parallel relationship and are positioned inwardly between the side rails 19, with each line shaft 45 being disposed closely adjacent a respective one of the side frame rails 19. Each line shaft 45 is rotatable about its longitudinally extending axis 46 which is horizontal and which perpendicularly intersects the rotational axes 23. Each line shaft 45 is rotatably supported from the adjacent side rail by a plurality of brackets 47 which are cantilevered inwardly from the respective side rail at selected longitudinally-spaced locations. The brackets 47 mount suitable bearings 48 which rotatably support the line shaft 45, with the brackets 47 in turn being fixedly secured to the respective side rail 19 through suitable securing shafts or screws 49 which are engaged with T-nuts 50 positioned within the T-slot 28.

The drive arrangement 15 also includes a drive motor 51 which is drivingly coupled to one or both line shafts 45 through a suitable drive transmitting mechanism 52 such as a gear or chain drive mechanism. The embodiment illustrated by FIG. 1 illustrates each line shaft 45 being driven by its own motor 51, in which case the two motors are appropriately synchronized by a suitable control, such as a microprocessor. However, a single motor can be provided for effecting simultaneous driving of both line shafts if desired.

The drive shaft 45 effects rotatable driving of the roller units associated with the respective side frame rail through a drive transmitting connection 53 (FIGS. 3 and 4) which couples the respective line shaft to each roller unit. This drive transmitting connection 53 includes a driving member 54 which is nonrotatably secured to the line shaft and which defines thereon a bevel gear 55, the latter being maintained in continuous meshing engagement with a further bevel gear 56 which is defined on the end of a gear member 57, the latter being coaxially fixed to the inner end of the drive member 37. The bevel gear 56 defines the inner free end of the cantilevered roller unit 22 and hence is disposed for direct meshing engagement with the gear 55 which is nonrotatably and concentrically secured to the respective line shaft 45, which line shaft is positioned directly adjacent the free end of the roller unit. With this overall arrangement, the line shaft 45, the roller unit 22, and the gearing connection therebetween, is thus disposed in its entirety closely adjacent but inwardly of the respective side frame rail 19. The region adjacent the outer side of the frame rail is thus unobstructed by driving members and the like.

In the illustrated and preferred embodiment, the drive member 37 (including the gear member 57) is formed as a monolithic one-piece member, preferably of a material possessing both bearing and strength properties, such as sintered metal. The sleeve roll 36 is also preferably formed of the same sintered metal so that the drive member 37 also function as a bearing for permitting relative rotation between the members 36 and 37 if necessary or desired, such as during load-induced overrun.

The two-piece roller 35 associated with each roller unit 22 also has a selectable coupling means 61 which cooperates between the sleeve roll 36 and the drive member 37 to permit either positive driving of the roll 36 from the member 37, or frictional driving thereof, depending upon the selected cooperation of the coupling means. For this purpose, the coupling means 61 includes a plurality of toothed-like lugs or protrusions 62 which are formed on the gear member 57 in angularly-spaced relationship thereon, which protrusions 62 project axially therefrom and are disposed radially outwardly from the cylindrical surface 41 adjacent the shoulder 42. The sleeve roll 36 similarly has a plurality of circumferentially-spaced recesses 63 which open axially inwardly from one axial end thereof, and which project radially outwardly from the inner cylindrical surface 43. The recesses 63 accommodate therein the protrusions 62 when the sleeve roll 36 is axially oriented as illustrated in FIGS. 3 and 4 to create a positive or nonrotatable drive connection between the members 36 and 37. In this condition, members 36 and 37 will always synchronously rotate, and rotation of the roll 36 relative to the drive member 37 is positively prevented.

However, the drive roll 36 also has a annular recess 64 which opens axially inwardly from the other axial end thereof, which recess 64 also projects radially outwardly from the inner cylindrical surface 43. By reversely axially orienting the sleeve roll 36 so that the lugs 62 project into the annular recess 64, no positive connection between the members 36 and 37 is created, and driving of roll 36 from member 37 occurs solely due to the frictional engagement between the annular cylindrical surfaces 41 and 43. Thus, relative slippage between the members 36 and 37, such as roller overrun, is permissible. The recesses 63 and 64 are of the same axial depth so that the axial end face on the roll 36 abuts the shoulder 42 on the drive member 37, and the roll 36 can be easily reversely axially oriented to provide either positive or nonpositive drive of the roll without requiring any significant change in the overall configuration of the roller unit, and without requiring any auxiliary or additional connecting or assembly elements.

In operation, the motor or motors 51 effect rotation of the drive shafts 45, which in turn effects driving through the meshing gears 55 and 56 so as to cause rotation of the rollers associated with the plurality of roller units 22. In the situation where the rollers are oriented as illustrated in FIGS. 3 and 4 such that the lugs 62 project into the recesses 63 to effect a positive connection between the drive member 37 and the sleeve roll 36, the roll 36 is positively rotated synchronously with the drive member 37 whenever the line shaft 45 are rotated, and similarly the rolls 36 are positively stopped and held stationary whenever the line shaft 45 is stopped.

On the other hand, if the sleeve roll 36 of each roller unit is reversely axially oriented such that the drive lugs 62 project into the annular recess 64, then a positive connection between the members 36 and 37 is not achieved. Rather, a driving connection between these members exist solely due to the frictional engagement between the opposed cylindrical surfaces 41 and 43. This permits driving of the rolls 36 by the drive members 37 to permit load advancement, particularly since the loads act downwardly on the rolls 36 and hence create a significant frictional engagement between the rolls 36 and the respective drive members 37. However, relative rotation or slippage between the roll 36 and the respective drive member 37 is permissible, such as due to load-induced overrun of the roll 36 when the drive member 37 is stopped, or conversely when the load is stopped by an external stop device while the line shaft 45 and drive member 37 continue to rotate.

With the improved conveyor of this invention, all of the structure of the roller units as well as the line shaft and the driving connections therefrom are all disposed interiorly of the side frame rails 19, thereby leaving the regions exteriorly of the frame rails 19 free of such structure. This greatly increases accessibility to the conveyor along both sides thereof, and improves the overall safety of operation relative to operating personnel by positioning the driving structure interiorly of the conveyor. At the same time, even though the line shafts are disposed interiorly adjacent the free ends of the roller units, a significantly wide and open region 24 still exists which permits irregular and particularly deep objects or loads to be accommodated on the conveyor so as to project downwardly between the line shafts, substantially as indicated diagrammatically by dotted lines in FIG. 2.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A powered roller conveyor for transporting loads, such as pallets, comprising:

a generally horizontally elongate frame defining a generally horizontally extending longitudinal direction and including first and second elongate and generally horizontally extending side frames disposed in generally parallel but sidewardly-spaced relation so as to define a transverse region therebetween;

a plurality of roller units mounted on each said side frame in spaced relation longitudinally along the respective side frame, said roller units being positioned adjacent an inner side of the respective side frame so as to be disposed within the transverse region;

each said roller unit including cantilevered mounting means fixed to the respective side frame and projecting horizontally sidewardly therefrom into said transverse region so as to terminate in a free end which is spaced a substantial distance from the other side frame, and roller means rotatably surrounding and supported on the cantilevered support means for rotation about a substantially horizontal roller axis which extends substantially perpendicularly to the longitudinal direction;

each said roller means including an inner cylindrical drive member which is rotatably supported on said mounting means for rotation about said roller axis, and a sleeve-like roller member which is concentric with said roller axis and is exteriorly rotatably supported on said cylindrical drive member, the roller means as mounted on each said side frame being positioned adjacent the inner side of the respective side frame within said transverse region so that the roller means on one said side frame are totally separate from and sidewardly-spaced from the roller means on the other said side frame to define an open load-accommodating space therebetween;

drive means extending longitudinally of said conveyor for rotatably driving said roller units as associated with said side frames, said drive means including first and second rotatably driven and substantially horizontally elongate line shafts associated with the respective first and second side frames, said first and second line shafts being respectively rotatable about substantially parallel first and second drive axes which extend substantially horizontally in perpendicular and intersecting relationship to said roller axes, said drive axes being sidewardly-spaced a substantial distance apart but disposed between said side frames within said transverse region; and a plurality of longitudinally-spaced gear units drivingly connected between each said line shaft and the roller means associated with the respective side frame, each said gear unit including a toothed drive gear fixed to the respective line shaft for rotation therewith and a toothed driven gear coaxially fixed to said cylindrical drive member adjacent an inner axial end thereof, said drive and driven gears being maintained in direct and continuous meshing engagement with one another.

2. A conveyor according to claim 1, wherein the roller member and the cylindrical drive member of each said roller means respectively define thereon inner and outer cylindrical surfaces which are maintained in supportive engagement but which permit relative rotation therebetween, each of said cylindrical drive and roller members being constructed of a bearing material.

3. A conveyor according to claim 2, wherein the driven gear and the respective cylindrical drive member comprise a monolithic one-piece member.

4. A conveyor according to claim 3, wherein the monolithic one-piece member is of a sintered metal.

5. A conveyor according to claim 2, wherein the roller means includes selectable coupling means coacting between said cylindrical drive and roller members for selecting between either frictional driving of said roller member from said cylindrical drive member or positive direct driving of said roller member from said cylindrical drive member.

6. A conveyor according to claim 2, wherein said roller means includes a drive coupling coacting between and nonrotatably connecting said cylindrical drive and roller members together only when said roller member is axially oriented in one direction relative to the respective cylindrical drive member, said drive coupling being disabled when said roller member is reversely axially oriented relative to the respective cylindrical drive member to permit solely frictional driving between said cylindrical drive and roller members.

7. A conveyor according to claim 6, wherein said drive coupling includes an axially projecting drive lug provided on said cylindrical drive member, and said cylindrical roller member at one axial end thereof has an axially projecting recess for receiving said drive lug to directly drivingly connect said cylindrical drive and roller members together, said roller member at the other axial end thereof having an annular recess for accommodating therein the drive lug when the roller member is reversely axially oriented to permit relative rotation between said cylindrical drive and roller members.

8. A conveyor according to claim 7, wherein each of said cylindrical drive and roller members is formed as an integral one-piece member constructed of a sintered metal, said driving and driven gears comprise bevel gears, and said driven gear is an integral part of the cylindrical drive member and is formed of sintered metal.

9. A conveyor according to claim 8, wherein the roller member is of short axial extent and is disposed in its entirety axially between the respective side frame and the respective driven gear, said driven gear being formed on an inner free end of said cylindrical drive member, and the respective line shaft being disposed adjacent but inwardly from said driven gear.

10. A powered roller conveyor for conveying loads, comprising:

a horizontally elongate frame defining a generally horizontally extending longitudinal direction, said frame including first and second elongate and generally horizontally extending side frames disposed in generally parallel but sidewardly-spaced relation so at to define a transverse region therebetween;

a plurality of horizontally cantilevered roller units mounted on each said side frame in spaced relationship longitudinally along the respective side frame and projecting generally horizontally toward the other side frame so as to terminate in a free end, the roller units on said first and second side frames projecting inwardly toward one another but being sidewardly-spaced apart by a substantial clearance space to accommodate positioning of a load therebetween;

each said roller unit including an axially-elongated one-piece drive member which is rotatably supported on the respective side frame for rotation about a substantially horizontal roller axis which extends substantially perpendicular to said longitudinal direction, said one-piece drive member defining thereon an exterior axially-elongate cylindrical bearing surface;

each roller unit also including a one-piece sleeve roller disposed concentrically in supporting relation to said drive member, said sleeve roller having a generally cylindrical bore extending coaxially therethrough, said bore including an elongate interior cylindrical surface disposed in radially closely adjacent surrounding relationship to the exterior cylindrical bearing surface of said drive member to support said sleeve roller on said drive member and to provide a frictional driving connection therebetween, said sleeve roller also having an outer load-engaging cylindrical surface disposed concentrically about the respective roller axis;

each said roller unit including a drive coupling coacting between and nonrotatably connecting said sleeve roller to said drive member only when said sleeve roller is axially oriented in one direction relative to the respective drive member, said drive coupling being disabled when said sleeve roller is reversely axially oriented relative to the respective drive member so as to permit solely frictional driving between said drive member and said sleeve roller; and drive means extending longitudinally of said conveyor and being directly drivingly connected to the drive member of each said roller unit for effecting rotation thereof.

11. A conveyor according to claim 10, wherein said drive means includes a horizontally elongated rotatable drive shaft positioned within said transverse region so that the axis of said drive shaft extends generally parallel to said longitudinal direction, said drive shaft being rotatably drivingly connected to the drive members of the roller units mounted on at least one of said side frames.

12. A conveyor according to claim 11, wherein said drive means includes a toothed driven bevel gear member coaxially fixed to an axially inner end of said drive member and disposed in direct meshing engagement with a toothed driving bevel gear member which is coaxially fixed to said drive shaft.

13. A conveyor according to claim 10, wherein said drive coupling includes an axially projecting drive lug provided on said drive member, and said sleeve roller at one axial end thereof has an axially projecting recess for receiving said drive lug to directly drivingly connect said drive member and said sleeve roller together, said sleeve roller at the other axial end thereof having an annular recess for accommodating therein the drive lug when the sleeve roller is reversely axially oriented to permit relative rotation between said drive member and said sleeve roller.

14. A conveyor according to claim 13, wherein the drive member and the respective sleeve roller are formed of sintered metal as integral one-piece members.

15. A powered roller conveyor for conveying loads, comprising:

a horizontally elongate frame defining a generally horizontally extending longitudinal direction, said frame including first and second elongate and generally horizontally extending side frames disposed in generally parallel but sidewardly-spaced relation so as to define a transverse region therebetween;

a plurality of horizontally cantilevered roller units mounted on each said side frame in spaced relationship longitudinally along the respective side frame and projecting generally horizontally toward the other side frame so as to terminate in a free end, the roller units on said first and second side frames projecting inwardly toward one another but being sidewardly-spaced apart by a substantial clearance space to accommodate positioning of a load therebetween;

each said roller unit including an axially-elongated one-piece drive member which is rotatably supported on the respective side frame for rotation about a substantially horizontal roller axis which extends substantially perpendicular to said longitudinal direction, said one-piece drive member defining thereon an exterior axially-elongate cylindrical bearing surface;

each roller unit also including a one-piece sleeve roller disposed concentrically in supporting relation to said drive member, said sleeve roller having a generally cylindrical bore extending coaxially therethrough, said bore including an elongate interior cylindrical surface disposed in radially closely adjacent surrounding relationship to the exterior cylindrical bearing surface of said drive member to support said sleeve roller on said drive member and to provide a frictional driving connection therebetween, said sleeve roller also having an outer load-engaging cylindrical surface disposed concentrically about the respective roller axis;

drive means extending longitudinally of said conveyor for rotatably driving said roller units as associated with at least one of said side frames, said driven means including a rotatably driven and substantially horizontally elongate line shaft associated with said one side frame, said line shaft being rotatable about a horizontally elongate drive axis which extends substantially horizontally in substantially perpendicular and intersecting relationship relative to said roller axes; and said drive means including gear means directly drivingly connected between said line shaft and the drive members of the roller units associated with said one side frame, said gear means including a driven bevel gear which is a fixed and integral part of said one-piece drive member and is defined on an inner axial free end thereof, said line shaft being disposed adjacent the inner axial free end of said drive member, and said gear means including a driving bevel gear nonrotatably mounted on said line shaft and disposed in direct meshing and driving engagement with the driven bevel gear associated with the drive member.

16. A conveyor according to claim 15, wherein the drive member is a monolithic one-piece member of sintered metal.

17. A conveyor according to claim 15, wherein each said roller unit associated with said one side frame includes selectable coupling means coacting between said drive member and the respective sleeve roller for selecting between either frictional driving of said sleeve roller from said drive member or positive driving of said sleeve roller from said drive member.

\* \* \* \* \*